United States Patent [19]

Nobuoka et al.

[11] Patent Number: 4,459,276

[45] Date of Patent: Jul. 10, 1984

[54] YELLOW IRON OXIDE PIGMENT AND METHOD FOR MANUFACTURE THEREOF

[75] Inventors: Soichiro Nobuoka, Toyonaka; Takashi Asai, Minoo; Kazuaki Ado, Ikeda, all of Japan

[73] Assignees: Agency of Industrial Science & Technology; Ministry of International Trade & Industry, both of Tokyo, Japan

[21] Appl. No.: 413,556

[22] Filed: Aug. 31, 1982

[30] Foreign Application Priority Data

Sep. 17, 1981 [JP] Japan .................................. 56-147172
Sep. 17, 1981 [JP] Japan .................................. 56-147173

[51] Int. Cl.$^3$ .......................... C01G 49/02; C09C 1/24
[52] U.S. Cl. ...................................... 423/633; 106/304
[58] Field of Search ................. 106/304; 423/633, 632

[56] References Cited

U.S. PATENT DOCUMENTS

| | | | |
|---|---|---|---|
| 3,969,494 | 7/1976 | Nobuoka et al. | 423/633 |
| 3,974,267 | 8/1976 | Urban | 423/633 |
| 4,251,504 | 2/1981 | Hamabata et al. | 423/633 |
| 4,339,425 | 7/1982 | Tokuoka | 423/633 |
| 4,349,456 | 9/1982 | Sowman | 423/633 |

FOREIGN PATENT DOCUMENTS

| | | | |
|---|---|---|---|
| 2924028 | 8/1980 | Fed. Rep. of Germany | 423/633 |
| 50-90599 | 7/1975 | Japan | 423/633 |
| 55-167137 | 12/1980 | Japan | 423/633 |
| 8005435 | 4/1981 | Netherlands | 423/633 |

*Primary Examiner*—Helen M. McCarthy
*Attorney, Agent, or Firm*—Oblon, Fisher, Spivak, McClelland & Maier

[57] ABSTRACT

Yellow iron oxide crystals having lengths in the range of 100 to 1000 nm and a major axis/motor axis length ratio in the range of 1.5 to 4.5 are produced by adding an aqueous ferric salt solution to an aqueous alkali solution, causing the two solutions to react with each other at a temperature in the range of $-5°$ to $30°$ C. thereby inducing precipitation of iron hydroxide, allowing the precipitate to age, then subjecting the aged precipitate to a hydrothermal treatment thereby producing crystals and, when necessary, further allowing the crystals to grow.

7 Claims, 5 Drawing Figures

YELLOW IRON OXIDE PIGMENT AND METHOD FOR MANUFACTURE THEREOF

BACKGROUND OF THE INVENTION

This invention relates to yellow pigment of iron oxide crystals having a particle shape represented by a major axis/minor axis length ratio falling in the range of 1.5 to 4.5 and having a particle size distribution in a narrow range and to a method for the manufacture of the yellow pigment. This invention is directed to providing yellow iron oxide pigment excelling in color tone, dispersibility and thermal resistance and developing this yellow pigment for new uses in thermoprocessing resins, cosmetics, traffic paints, etc.

Yellow pigments with highly desirable properties available today include chrome yellow, strontium yellow, cadmium yellow, and bendizine yellow. Since these yellow pigments are invariably toxic or carcinogenic substances, their use is strictly controlled for the prevention of environmental pollution and for the preservation of human health.

In the coloring material industry, therefore, development of an excellent nontoxic yellow pigment has been desired.

Yellow iron oxide has a composition of $\alpha$-FeOOH and a structure of Goethite and has been long used as a coloring material known popularly as goethite, loess, ocher. It shows no toxicity, enjoys weather resistance and stability, and is not expensive. The uses found for this compound cover coloration of paints, printing inks and building materials and, because of its freedom from toxicity, further include coloration of cosmetics, roll papers for tobacco filters and chicken feed. Since the end of the war, it has come to be used as a raw material for the magnetic powder in magnetic recording. The demand for this compound is growing conspicuously. The compound when used as a pigment entails disadvantages that the color tone is slightly unclear, that the viscosity is high due to the acicular shape of the particles and that the thermal resistance is inferior. Because of these inferior properties, the use of this compound as a substitute for the aforementioned toxic yellow pigments has been restricted. Improvement of the properties and enhancement of the quality of this compound as a pigment, therefore, has been desired.

Figure 1:
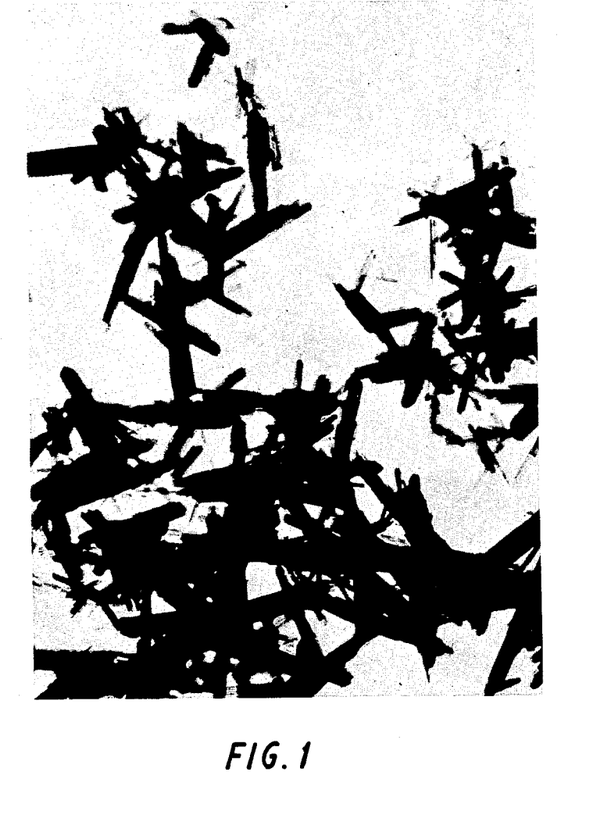
FIG. 1 and FIG. 2 represent electron photomicrographs, at 40,000 magnifications, of yellow iron oxide products manufactured by conventional methods for commercial distribution.
Figure 2:
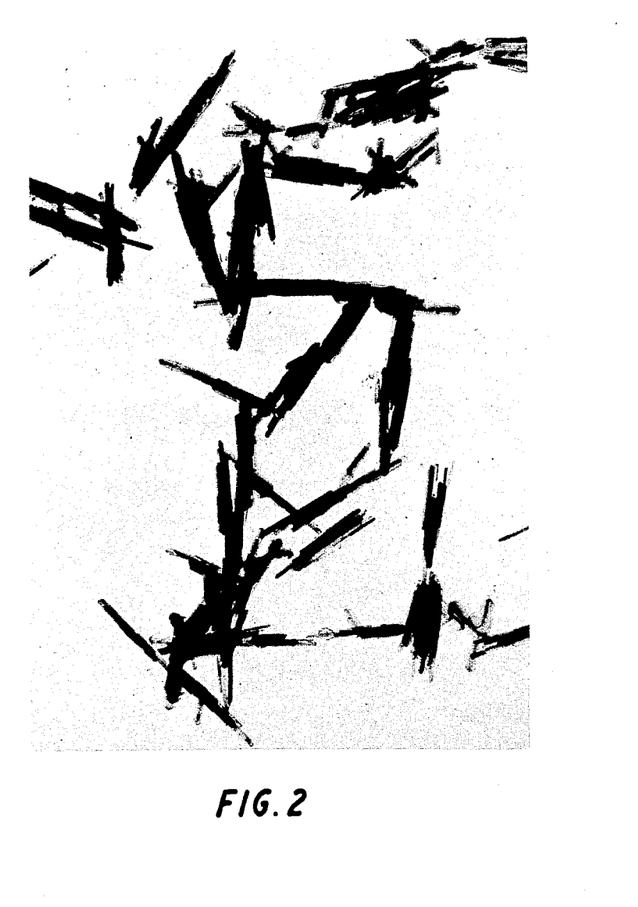

For the manufacture of yellow iron oxide, the method which causes microcystalline cores of iron oxide to grow to a desired particle diameter by utilizing the hydrolysis of an aqueous ferrous sulfate solution and the reaction of air oxidation is now in popular use. For very gently neutralizing the sulfuric acid produced by the hydrolysis of the aqueous ferrous sulfate solution and accelerating the growth of crystals, there are known to the art a method which uses iron filings [Nobuoka et al., Kogyo Kagaku Zasshi 66, 412 (1963)] and a method which makes use of ammonia gas (Yada, Electronic Ceramics, '72, No. 1, p. 15) are known to the art. FIG. 1 and FIG. 2 represent electron photomicrographs, at 40,000 magnifications, of samples of yellow iron oxide produced by the methods described above for commercial sale. Their particles are in the shape of dendritic or acicular tactoids having an axial ratio (minor axis/minor axis) of not less than 5.0. They include giant particles and fine particles. The acicular particles have widely varied axial ratios, with the particle sizes distributed in a wide range. The methods used for their production are based on the growth of crystals in aqueous solutions of insoluble salts. In view of the mechanism responsible for their production, it is considered extremely difficult to obtain crystals of more uniform particle sizes and more uniform quality than are attainable at present and it is considered infeasible to alter the shape and axial ratio of particles by merely adjusting the production conditions involved.

It is widely known that the properties exhibited by a given powdery system are generally interrelated with the morphology of individual particles making up the powdery system. In a pigment, the morphology of its particles has effects upon color tone, hiding power, oil absorption, and tinting strength and upon rheological properties and film strength of the pigment as used in paints. In the case of yellow iron oxide, if it contains giant particles and fine particles at the same time, the properties exhibited by the giant particles and those exhibited by the fine particles are different. The properties which the pigment exhibits as one powdery system are statistical averages of such two sets of properties and such original properties are no longer retained. In the case of color tone, for example, since the color produced by giant particles and the color produced by fine particles are different as described in Nobuoka, Report of the Government Industrial Research Institute, Osaka, No. 331, p. 33 (1969), combination of these particles results in a subtractive mixture as in the mixture of colors. Consequently, both lightness and saturation are lowered and a darkish color tone is obtained. Ideally, therefore, the pigment should be a powder having a particle size distribution in a narrow range. The pigment is further desired to be formed of acicular particles which have a small axial ratio, possess a high dispersing property, and exhibit a low oil absorption.

The inventors continued a diligent study on yellow iron oxide for many years and contributed to the improvement of quality of this compound. The inventions resulting from this study have matured into the following patents and patent publications: Japanese Patent Publication SHO 31(1956)-3292 to Ando and Nobuoka, Japanese Patent Publication SHO 53(1978)-28158) to Nobuoka, Asai and Ado, U.S. Pat. No. 3,969,494 to Nobuoka, Asai and Ado, and Japanese Patent Publication SHO 55(1980)-5016 to Nobuoka et al. These inventions have been being reduced to practice.

To make an excellent pigment, the yellow iron oxide is required to have a small axial (major axis/minor axis) ratio, a narrow range of particle size distribution, and a particle size suitable for the particular purpose.

SUMMARY OF THE INVENTION

This invention has succeeded in improving the morphology of yellow iron oxide particles from an acicular form to a form having a specific axial (major axis/minor axis) ratio and narrowing the range of particle size distribution. Consequently, the various properties of the compound as a pigment, i.e. color tone, dispersing property, and stability, have been greatly improved.

The particles of the yellow iron oxide produced by the present invention have lengths in the range of 100 to 1000 nm and an axial (major axis/minor axis) ratio in the range of 1.5 to 4.5. The yellow iron oxide is produced by the following method.

First, an aqueous ferric salt solution is added to an aqueous alkali solution at a temperature of not more than 30° C. And the two compounds in the mixture are allowed to react with each other at a temperature in the range of −5° to 30° C. to induce precipitation of iron hydroxide. Then this iron oxide is allowed to age. The aged iron hydroxide is subsequently subjected to a hydrothermal treatment at a temperature in the range of 120° to 250° C. to produce yellow iron oxide particles having lengths in the range of 100 to 350 nm and an axial (major axis/minor axis) ratio in the range of 1.5 to 4.5.

Then, the particles produced are dispersed as seed crystals in an aqueous ferrous salt solution, and iron filing are added to the dispersion. Then, air is blown into the aqueous dispersion to cause deposition and growth of yellow iron oxide on the seed crystals until there are obtained yellow iron oxide particles having lengths exceeding 350 nm and not exceeding 1000 nm and an axial (major axis/minor axis) ratio in the range of 1.5 to 4.5.

DETAILED DESCRIPTION OF THE PREFERRED EMBODIMENT

Now, the construction of this invention will be described below. First, the method by which yellow iron oxide particles having lengths in the range of 100 to 350 nm and an axial ratio in the range of 1.5 to 4.5 are manufactured will be explained. By the reaction of an aqueous ferric salt solution with an aqueous alkali solution, there is prepared precipitated iron hydroxide. The ferric salt used in this case is a water-soluble iron salt such as ferric sulfate, ferric chloride, or ferric nitrate, for example. The concentration of the salt in its aqueous solution is not allowed to exceed 0.5 M/liter but is desired to fall in the neighborhood of 0.2 M/liter. The lowest allowable concentration of the salt is 0.02 M/liter. The alkali used in this case is sodium hydroxide, potassium hydroxide, sodium carbonate, potassium carbonate, or calcium hydroxide, for example. The concentration of the alkali in its aqueous solution is not allowed to exceed 4 M/liter but is desired to fall in the neighborhood of 1 M/liter. The lowest allowable concentration is 0.1 M/liter. When these reactants are used in concentrations exceeding the upper limits, the product of the reaction lacks uniform quality and has a wide range of particle size distribution. When they are used in concentrations not reaching the lower limits, the reaction proceeds so slowly and the product is so small in quantity as to render the reaction economically infeasible.

The aqueous iron salt solution is made to react upon the aqueous alkali solution at a temperature in the range of −5° to 30° C. In this case, it is imperative that the iron salt solution should be added to the aqueous alkali solution. If this manner of addition is reversed, the yellow iron oxide particles finally produced by the reaction will have the shape of acicular particles having a large axial ratio. The temperature at which the two aqueous solutions are subjected to the reaction is an important factor which affects particle diameters and axial ratio of the final product. If this temperature exceeds 30° C., the reaction will tend to produce particles of the form of tactoids having an excessively large axial ratio. By the reaction carried out under such conditions as described above, there is prepared precipitated iron hydroxide. Then, the precipitated iron hydroxide is allowed to age. This aging of the precipitate is effected by keeping the produced precipitate together with the mother liquor for at least 30 minutes, preferably for one day, after its occurrence. It is by this aging that the yellow iron oxide particles finally produced will acquire uniform quality and uniform particle size. The aged precipitate is subjected to a hydrothermal treatment at a temperature in the range of 120° to 250° C., preferably near 180° C. for about one hour. If the temperature of treatment is below the lower limit, crystallization requires an excessively long time. If the temperature is above the upper limit, the product will come to contain red iron oxide, $\alpha\text{-Fe}_2\text{O}_3$. The hydrothermal treatment is continued until crystallization terminates. By this hydrothermal treatment, the amorphous iron hydroxide precipitate is crystallized. In the course of the crystallization, the particles of iron (III) hydroxide oxide, $\alpha$-FeOOH, namely yellow iron oxide, having lengths in the range of 100 to 350 nm and an axial ratio in the range of 1.5 to 4.5 are formed mainly through the actions of solution and deposition.

The method described above is aimed at producing yellow iron oxide particles differing in morphology from the yellow iron oxide particles obtained by the conventional methods and is characterized by the conditions for the formation of precipitated iron hydroxide. Since no definite theory has yet been established concerning the adjustment of the form of crystals, the inventors have brought this invention to perfection through numerous experiments.

Now, this invention which produces yellow iron oxide particles having lengths in the range of 100 to 350 nm as described above will be described below with reference to a typical experiment. As an iron salt, an aqueous solution containing 50 g of ferric chloride, $\text{FeCl}_3 \cdot 6\text{H}_2\text{O}$, per liter (equal to about 0.2 M/liter) was used. As an alkali, an aqueous solution containing 75 g of sodium hydroxide, NaOH, per 2 liters (equal to about 1 M/liter) was used. With the two solutions held at a temperature in the range of −5° to 30° C., the aqueous $\text{FeCl}_3$ solution was added to the aqueous NaOH solution to induce a reaction of precipitation and prepare precipitated iron hydroxide. In this case, it was found to be important that excess free alkali be present in the mother liquor. The concentration of the excess free alkali was about 0.4 M/liter. If the concentration of the free alkali exceeds 1 M/liter, there ensues an undesirable phenomenon that the produced particles are decayed. When the precipitated iron hydroxide was allowed to age in conjunction with the mother liquor for one day and then subjected to a hydrothermal treatment at 180° C. for about one hour, there was produced iron (III) hydroxide oxide, $\alpha$-FeOOH, namely yellow iron oxide. Of the typical results of a number of runs of this experiment using the temperature of reaction for the formation of precipitate as the sole variable, pigment properties are shown in Table 1.

By the treatments described above, yellow iron oxide particles having a uniform particle size were obtained. For the determination of their particle size properties, 100 particles selected from among the particles appearing in an electron photomicrograph of a given sample were measured for diameters, from which were derived average, standard deviation, and coefficient of variation (%) by calculation. The formulas used for the calculation are shown below.

$$\sigma = \sqrt{\frac{\Sigma\{n(D_p - \overline{D}_p)^2\}}{\Sigma n}} \quad (1)$$

$$C.V. (\%) = \frac{\sigma}{\overline{D}_p} \times 100 \quad (2)$$

where,
σ: Standard deviation
C.V.: Coefficient of variation (%)
$D_p$: Particle diameter
$\overline{D}_p$: Average particle diameter
n: Number of particles The numerical values of particle diameter given in Table 1 represent those of average particle diameter $\overline{D}_p$. The corresponding numerical values of the coefficient of variation (C.V.) all fall in the range of 7 to 10%. In Run C-102, the standard deviation, σ, of minor axis is 4.3 nm and the coefficient of variation is 7.8%.

quently, the axial ratio decreases when the temperature of reaction is not more than 30° C. Particularly when the temperature is in the range of −5° to 20° C., the axial ratio is up to about 3, a value suitable for pigment properties. The yellow iron oxide particles produced under such temperature conditions feature uniform particle size. The numerical values of coefficient of variation of minor axis obtained in the different runs and shown in Table 1 fall in the range of 7 to 10%. They are quite small. Commercially available yellow iron oxide particles have very large coefficients of variation; 45% with the particles of FIG. 1 and 38% with the particles of FIG. 2.

Now, the yellow iron oxide particles having lengths in the range of 350 to 1000 nm and an axial ratio in the range of 1.5 to 4.5 will be described below. These yellow iron oxide particles are produced by using, as seed crystals, the aforementioned yellow iron oxide particles having lengths in the range of 100 to 350 nm and allowing them to grow.

They are produced by the following method. The aforementioned yellow iron oxide crystals having lengths in the range of 100 to 350 nm are added to an

TABLE 1

| Run No. | Temperature of reaction (°C.) | Morphology of particles | | | Specific*1 surface area (m²/g) | Hiding*2 power (cm²/g) | Volume of*3 precipitate (ml/g) |
| | | Major axis (nm) | Minor axis (nm) | Axial ratio | | | |
| --- | --- | --- | --- | --- | --- | --- | --- |
| C-101 | −5 | 97 | 51 | 1.9 | 38 | 520 | 10.2 |
| C-102*4 | 0 | 134 | 55 | 2.4 | 35 | 530 | 10.0 |
| C-103 | 5 | 154 | 59 | 2.6 | 33 | 550 | 8.4 |
| C-104 | 10 | 190 | 65 | 2.9 | 30 | 570 | 8.3 |
| C-105 | 15 | 219 | 73 | 3.0 | 28 | 730 | 9.0 |
| C-106 | 20 | 256 | 83 | 3.1 | 26 | 940 | 10.5 |
| C-107 | 25 | 317 | 88 | 3.6 | 25 | 1010 | 10.8 |
| C-108 | 30 | 418 | 93 | 4.5 | 23 | 1060 | 11.0 |
| C-109 | 35 | 1280 | 90 | 14.2 | 22 | 1050 | 17.5 |

Figure 3:
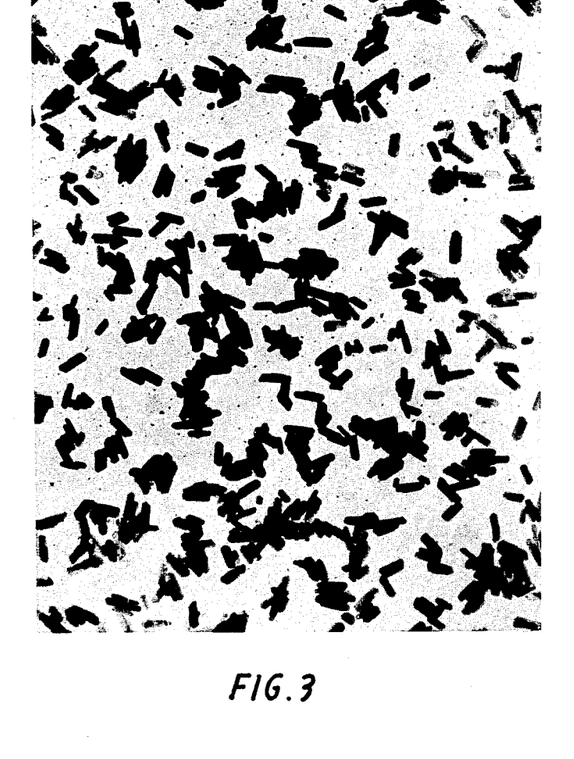
FIG. 3, FIG. 4, and FIG. 5 represent electron photomicrographs, at 40,000 magnifications, of samples of yellow iron oxide of this invention produced respectively as indicated in Examples 1, 3, and 4.

*1BET method;
*2JIS K-5101;
*3Volume of precipitate in water;
*4See FIG. 3.

From the test results of Table 1, it is noted that the particles gain in growth both in the major axis and the minor axis in proportion as the temperature of reaction rises. The axial ratio increases with the increasing temperature of reaction, because growth is faster in the major axis than in the minor axis. The axial ratio begins to increase sharply near 30° C. The specific surface area is roughly in direct proportion to the oil absorption and, therefore, is desired to be as low as possible. The fact that the axial ratio of particles increases and consequently the bulkiness of particles increases does not prove advantageous from the standpoint of the dispersion of particles. The volume of precipitate or the bulkiness of particles increases in proportion to the axial ratio. The hiding power increases roughly in direct proportion to the minor axis of the particles. The relation between acicular particles and pigment properties is dealt with in detail in Nobuoka, Report of the Government Industrial Research Institute, Osaka, No. 331, p. 35 (1969) and Nobuoka, Ado and Asai, Meeting for Publication of Researches on Coloring Materials (1980). Generally, from the standpoint of pigment properties, particles are ideally desired to be in the shape of spheres which have the least possible surface energy. In the case of acicular particles, the color tone and hiding power are mainly governed by the minor axis (width) of particles. From the data of Table 1, it is noted that the shape of particles approaches a spherical shape and, conseaqueous ferrous sulfate solution. In this aqueous solution, the seed crystals are allowed to grow by hydrolysis and air oxidation of ferrous sulfate. These reactions are believed to proceed as indicated by the following reaction formula.

$$4FeSO_4 + O_2 + 6H_2O \rightarrow 4\alpha\text{-FeOOH} + 4H_2SO_4 \quad (1)$$

The compound α-FeOOH which is gradually produced by the reactions is deposited on the surface of seed crystals. As the concentration of sulfuric acid increases to a certain level, these reactions reach equilibrium and stop. As a measure to neutralize the sulfuric acid very gently, allow the reaction of the formula (1) to proceed toward the right, and accelerate the growth of crystals, the method of Formula (2) which resorts to addition of metallic iron or the method of Formula (3) which makes use of ammonia gas is available.

$$H_2SO_4 + Fe \rightarrow FeSO_4 + H_2 \quad (2)$$

$$H_2SO_4 + NH_3 \rightarrow (NH_4)_2SO_4 \quad (3)$$

Either of the two methods will do for the growth of seed crystals. For the growth to proceed uniformly and smoothly, however, it is important to preclude occurrence of secondary cores and dendritic crystals by suitably adjusting the amount of seed crystals added, the volume of air blown in, the temperature of reaction, the concentrations of reactants in their aqueous solutions, and the manner of agitation of aqueous dispersion. When the conditions for crystal growth are proper and are rigidly controlled, the seed crystals used for the growth of crystals generally grow in similar shapes by retaining the initial form. No alteration of form occurs in the course of the growth of crystals. The production of the yellow iron oxide particles aimed at by this invention, therefore, is accomplished by allowing the growth of seed crystals to be continued by the method described above until the major axis of the crystals reaches the required value.

Pigments are used as coloring materials for paints, printing inks and cosmetics, for example. The color tone, dispersibility in vehicles, and weather resistance, therefore, constitute important properties for the pigments. In the case of yellow iron oxide, since its particles have an acicular form, the color tone of this pigment is governed by the minor axis of its particles.

In other words, the minor diameter and the lightness of the particles are interrelated. Practically, the degree of lightness which the yellow iron oxide is desired to possess to be used advantageously as a pigment is variable from one use to another. In fact, all pigment makers make the rule of preparing one pigment in several grades of different degrees of lightness to meet users' choices. As shown in Table 1, the hiding power varies with the minor diameter of particles. Generally, the lightness of a pigment increases substantially in direct proportion to the hiding power. When the pigment has a low hiding power, it tends to assume transparency. It is, therefore, used as a yellow pigment of low opacity.

Of course, the dispersibility of a pigment in a vehicle reaches its maximum when the pigment is made up of spherical particles which show the smallest surface energy as described above. In the case of yellow iron oxide, no method has yet been invented for successful synthesis of the compound in the form of spherical particles. The inventors have succeeded in improving various pigment properties of yellow iron oxide by perfecting a method for manufacturing yellow iron oxide particles having a smaller axial (major axis/minor axis) ratio than conventional ones. The difference of the dispersibility in a vehicle between the product of this invention and the conventional product is similar to the difference between sewing needles and ball bearings both of steel regarded as simulating their respective particles. While the former particles are bulky and are intertwined so much as to render their dispersion difficult, the latter particles are not bulky and are readily dispersed. The yellow iron oxide having a small axial ratio, as compared with a yellow iron oxide having a comparable color and a greater axial ratio, exhibits a low oil absorption, low bulkiness, and ready dispersibility, and produces a dispersion of low viscosity. These are highly desirable properties for a pigment. Although the weather resistance and thermal resistance are inherent in a given compound, they are affected by the uniformity of size, crystallinity, and particle size distribution of its particles in the case of a pigment. In this respect, the yellow iron oxide of the present invention excels in these properties as described above because its particles have undergone perfect crystallization by the hydrothermal treatment.

Now, the present invention will be described more specifically below with reference to working examples.

EXAMPLE 1

An aqueous solution containing 50 g of $FeCl_3.6H_2O$ per liter and an aqueous solution containing 75 g of NaOH per 2 liters were separately prepared. The two aqueous solutions were kept cooled at $-2°$ C. Then, the aqueous $FeCl_3$ solution was gradually added while under stirring to the aqueous NaOH solution to prepare a precipitate $Fe(OH)_3$. At the end of the precipitation, the temperature of the reaction mixture was about 0° C. The mother liquor contained an excess of alkali. The concentration of the free alkali was about 0.4 M/liter. The precipitate was allowed to age in conjunction with the mother liquor, with occasional stirring, for one day. After the aging, the sedimentary volume of the precipitate reached about 250 ml. The supernatant was removed and discarded. About 300 ml of the remaining mixture of precipitate and mother liquor was transferred into a Teflon beaker, set in position in an autoclave, and subjected to a hydrothermal treatment at 180° C. for 60 minutes. The pressure during the treatment was the saturated pressure of steam. By this treatment, the brown precipitate of amorphous $Fe(OH)_3$ was thoroughly crystallized into a yellow crystalline precipitate ($\alpha$-FeOOH). When this mixture was washed with water, the volume of the precipitate decreased to 150 ml. When this precipitate was further filtered and dried, there was obtained iron (III) hydroxide oxide, $\alpha$-FeOOH, or yellow iron oxide having a small axial ratio as described below. The pigment properties of this product were as follows: Particle diameters, 134 nm in major axis and 55 nm in minor axis; standard deviation, $\sigma$, 4.3 nm; coefficient of variation, C.V., 7.8%; axial ratio, 2.4; specific surface area, 35 $m^2/g$; hiding power, 530 $cm^2/g$; amount produced, 15 g; and sedimentary volume of precipitate, 10 ml/g.

FIG. 3 represents an electron photomicrograph, at 40000 magnifications, of particles produced in this example.

EXAMPLE 2

An aqueous solution containing 36 g of $Fe_2(SO_4)_3$ per liter and an aqueous solution containing 75 g of NaOH per 2 liters were separately prepared. The two aqueous solutions were kept cooled at 9° C. Then the aqueous $Fe_2(SO_4)_3$ solution was gradually added, while under thorough stirring, into the aqueous NaOH solution to produce $Fe(OH)_3$ in the form of precipitate. At the end of the precipitation, the temperature of the reaction mixture was about 10° C. The mother liquor contained an excess of alkali. The concentration of the free alkali was 0.4 M/liter. Thereafter, by following the procedure of Example 1, there was obtained yellow iron oxide having a small axial ratio as described below. The pigment properties of the product were as follows: Particle diameters, 194 nm in major axis and 70 nm in minor axis; standard deviation, $\sigma$, 6.0 nm; coefficient of variation, C.V., 8.5%; axial ratio, 2.8; specific surface area, 30 $m^2/g$; hiding power, 580 $cm^2/g$; and amount of product, 15 g.

EXAMPLE 3

An aqueous solution containing 75 g of $Fe(NO_3)_3.9H_2O$ per liter and an aqueous solution containing 100 g of KOH per 2 liters were separately prepared. The two aqueous solutions were kept cooled at 19° C. Then, the aqueous $Fe(NO_3)_3$ solution was gradually added, while under thorough stirring, to the aqueous KOH solution to produce Fe(OH)$_3$ in the form of precipitate. At the end of the precipitation, the temperature of the reaction mixture was about 20° C. The mother liquor contained an excess of alkali. The concentration of the excess alkali was about 0.4 M/liter. Thereafter, by following the procedure of Example 1, there was obtained yellow iron oxide having a small axial ratio as described below. The pigment properties of this product were as follows: Particle diameters, 266 nm in major axis and 82 nm in minor axis; standard deviation, $\sigma$, 7.1 nm; coefficient of variation, C.V., 8.7%; axial ratio, 3.2; specific surface area, 26 m$^2$/g; hiding power, 920 cm$^2$/g; and amount of product, 16 g.

Figure 4:
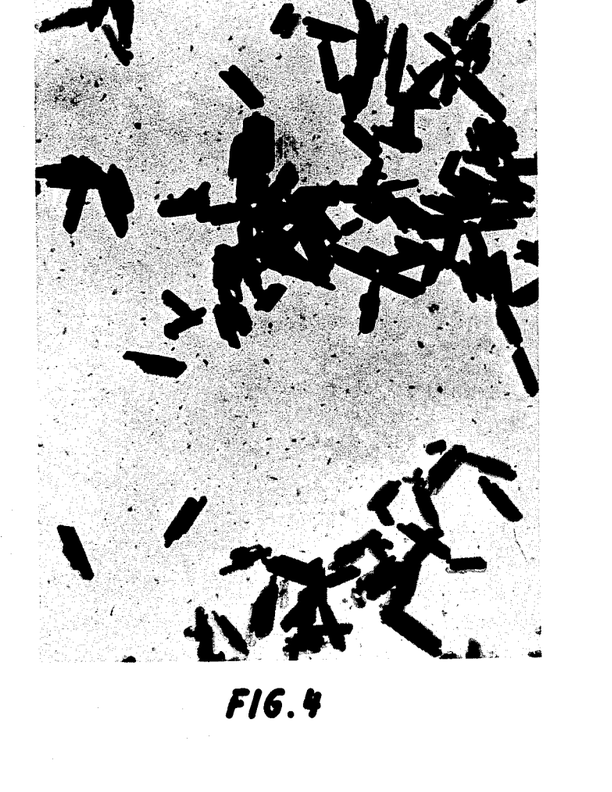

FIG. 4 represents an electron photomicrograph, at 40000 magnifications, of particles produced in this example.

EXAMPLE 4

Figure 5:
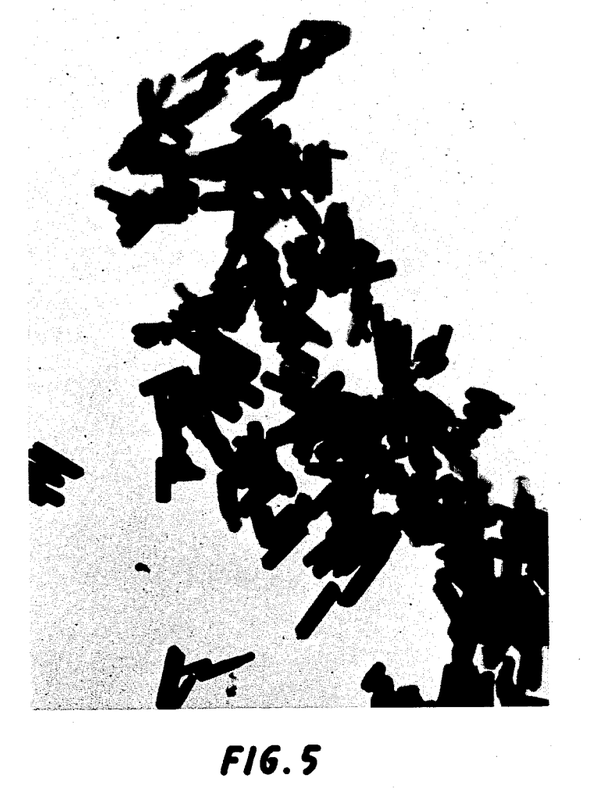

The particles of yellow iron oxide, $\alpha$-FeOOH, obtained in Example 1 were used as seed crystals and were caused to grow. This growth was effected by adding 300 g of the seed crystals to an aqueous solution containing 500 g of ferrous sulfate crystals, FeSO$_4$.7H$_2$O in 20 liters of water and further suspending 2500 g of iron wires in the aqueous solution. This aqueous solution was kept at 60° C. and kept stirred, and air was blown into the aqueous solution at a rate of 500 ml/minute for growth of the seed crystals. By the hydrolysis and oxidation of the aqueous FeSO$_4$ solution, $\alpha$-FeOOH gradually and uniformly deposited on the surface of the seed crystals and, consequently, the seed crystals grew in size. With these reaction conditions rigidly controlled, the growth of crystals was continued for a period of 200 hours. At the 100th hour in the course of the crystal growth, 500 g of iron wires were additionally suspended in the aqueous solution. At fixed intervals of 10 hours along the course of crystal growth, samples were taken and tested for particle form, specific surface area, hiding power, etc. The results were as shown in Table 2.

this example. In the case of these particles, the standard deviation of minor axis, $\sigma$, was 11.1 nm and the coefficient of variation, C.V., was 10.0%. The samples in Table 2 showed coefficients of variation of minor axis in the range of 8 to 15%. These values are quite low as compared with the values, 38 to 45%, obtained for the conventional products. As the growth of particles proceeded, the specific surface area decreased. After 160 hours of crystal growth, the specific surface area decreased to about 1/7 of the original level. The hiding power began to increase sharply near 80 nm of minor axis, reached its maximum along 90 to 150 nm, and began to fall gradually beyond 150 nm. Since the hiding power is roughly in direct proportion to the lightness, the particles ought to give the brightest color along 90 to 150 nm of minor axis. As the minor axis increased beyond 150 nm, the lightness fell and the saturation rose. Since the color tone varies in proportion to the growth of pigment particles as indicated above, practically it suffices to prepare particles of desired color tone and use them as a pigment. A yellow iron oxide pigment having a small axial ratio and uniform particle size can be produced as described above.

What is claimed is:

1. Yellow iron oxide particles of substantially spherical shape having lengths in the range of 100 to 1000 nm and a length ratio of major axis to minor axis in the range of 1.5 to about 3.

2. Yellow iron oxide particles according to claim 1, wherein the lengths of particles are in the range of 100 to 350 nm.

3. Yellow iron oxide particles according to claim 1, wherein the lengths of particles exceed 350 nm and do not exceed 1000 nm.

4. A method for the manufacture of yellow iron oxide particles of substantially spherical shape having lengths in the range of 100 to 350 nm and a length ratio of major axis to minor axis in the range of 1.5 to about 3, which comprises adding an aqueous ferric salt solution, wherein the concentration of ferric salts in its aqueous

TABLE 2

| Run No. | Growth Period (hour) | Morphology of particles | | | Specific[1] surface area (m$^2$/g) | Hiding[2] power (cm$^2$/g) | Remarks |
|---|---|---|---|---|---|---|---|
| | | Major axis (nm) | Minor axis (nm) | Axial ratio | | | |
| | 0 | 134 | 55 | 2.4 | 35 | 530 | seed crystal (FIG. 3) |
| A-210 | 10 | 162 | 62 | 2.6 | 31 | 550 | |
| A-220 | 20 | 188 | 67 | 2.8 | 28 | 580 | |
| A-230 | 30 | 219 | 75 | 2.9 | 26 | 760 | |
| A-240 | 40 | 240 | 82 | 2.9 | 23 | 950 | |
| A-250 | 50 | 273 | 90 | 3.0 | 21 | 1030 | |
| A-260 | 60 | 300 | 96 | 3.1 | 19 | 1100 | |
| A-270 | 70 | 318 | 105 | 3.0 | 18 | 1100 | |
| A-280 | 80 | 350 | 112 | 3.1 | 15 | 1100 | (FIG. 5) |
| A-290 | 90 | 356 | 117 | 3.0 | 13 | 1100 | |
| A-300 | 100 | 368 | 123 | 3.0 | 11 | 1090 | |
| A-320 | 120 | 415 | 134 | 3.1 | 7 | 1060 | |
| A-340 | 140 | 444 | 143 | 3.1 | 6 | 980 | |
| A-360 | 160 | 457 | 151 | 3.0 | 5 | 950 | |
| A-380 | 180 | 480 | 155 | 3.1 | — | 900 | |
| A-400 | 200 | 502 | 160 | 3.1 | — | 860 | |

[1] BET method;
[2] JIS K-5101

From the test results of Table 2, it is noted that the seed crystals continued growth while retaining a similar form to the origial seed crystals. The minor axes of the particles nearly doubled after 80 hours of growth and nearly tripled after 200 hours of growth. FIG. 5 represents an electron photomicrograph, at 40000 magnifications, of particles obtained after 80 hours of growth in solution is in the range of 0.02 to 0.5 M/liter, to an aqueous alkali solution, wherein the concentration of alkali in its aqueous solution is in the range of 0.1 to 4.0 M/liter, at a temperature of not more than 20° C., causing the reactants to react at a temperature in the range of −5° to 20° C. thereby producing iron hydroxide in the form of precipitate, where the free alkali concentration after the formation of the precipitated iron hydroxide is not more than 1.0 M/liter, then allowing the precipitated iron hydroxide to age, and subjecting the aged iron hydroxide to a hydrothermal treatment at a temperature in the range of 120° C. to 250° C.

5. A method for the manufacture of yellow iron oxide particles of substantially spherical shape having lengths exceeding 350 nm and not exceeding 1000 nm and length ratio of major axis to minor axis in the range of 1.5 to about 3, which comprises adding an aqueous ferric salt solution where the concentration of ferric salt in its aqueous solution is in the range of 0.02 to 0.5 M/liter, to an aqueous alkali solution, where the concentration of alkali in its aqueous solution is in the range of 0.1 to 4 M/liter, at a temperature of not more than 20° C., causing the reactants to react at a temperature in the range of −5° to 20° C. thereby producing iron hydroxide in the form of precipitate, where the alkali concentration after the formation of the iron oxide precipitate is not more than 1.0 M/liter, then allowing the precipitated iron hydroxide to age, and subjecting the aged iron hydroxide to a hydrothermal treatment at a temperature in the range of 120° to 250° C. thereby producing yellow iron oxide particles, said particles of substantially spherical shape having lengths in the range of 100 to 350 nm and a length ratio of major axis to minor axis in the range of 1.5 to about 3, dispersing said particles as seed crystals in an aqueous ferrous salt solution, and subsequently blowing air into the aqueous solution thereby depositing and growing yellow iron oxide on the surface of said seed crystals.

6. A method according to claim 5, further comprising the step of adding metal iron to the aqueous ferrous salt solution having air blown thereinto, thereby facilitating deposit and growth of yellow iron oxide on the surface of said seed crystals.

7. A method according to claim 5, further comprising the step of blowing ammonia into the aqueous ferrous salt solution having air blown thereinto, thereby facilitating deposit and growth of yellow iron oxide on the surface of said seed crystals.

* * * * *